United States Patent [19]

Giacomello

[11] Patent Number: 4,459,641

[45] Date of Patent: Jul. 10, 1984

[54] MOUNTING SPACER DEVICE FOR CAPACITOR

[75] Inventor: Giacomo Giacomello, Milan, Italy

[73] Assignee: Sprague Electric Company, North Adams, Mass.

[21] Appl. No.: 341,404

[22] Filed: Jan. 21, 1982

[51] Int. Cl.³ .......................... H01G 9/06; H01G 9/08
[52] U.S. Cl. ...................................................... 361/433
[58] Field of Search .......................................... 361/433

[56] References Cited

U.S. PATENT DOCUMENTS

| | | | |
|---|---|---|---|
| 1,395,281 | 11/1921 | Koretzky . | |
| 1,874,111 | 8/1932 | Mershon | 361/433 |
| 2,236,496 | 4/1941 | Beggs | 361/433 X |
| 2,287,114 | 6/1942 | McEachron | 136/132 |
| 2,643,327 | 6/1953 | Macklenar | 240/10.66 |
| 2,758,259 | 8/1956 | Peck | 317/230 |
| 2,962,638 | 11/1960 | Nieders | 317/230 |
| 3,014,978 | 12/1961 | Lebert et al. | 174/52 |
| 3,204,164 | 8/1965 | Burke et al. | 317/260 |

FOREIGN PATENT DOCUMENTS 1109458  4/1968  United Kingdom .

Primary Examiner—L. T. Hix
Assistant Examiner—Della Rutledge

[57] ABSTRACT

An antivibration mounting-spacer device for an electrolytic capacitor section consists of a sheet of material that can be wrapped around the rolled section and has a plurality of fingers extending outwardly from one side of the sheet away from the section. The sheet is rectangular, and its dimensions are such that the sheet extends beyond both ends of the section and encompasses at least a major portion of the circumference of said section. When the section with the sheet wrapped around it is inserted into a capacitor can or container, the fingers bend enough to allow insertion but remain urged against the inner surface thus holding the section in place and preventing its vibration.

1 Claim, 3 Drawing Figures

MOUNTING SPACER DEVICE FOR CAPACITOR

BACKGROUND OF THE INVENTION

This invention relates to a mounting spacer device for a wound electrolytic capacitor that prevents its movement and vibration in a capacitor housing without using pitch or wax.

There have been many ways that capacitor sections have been mounted in capacitor housings. The sections have been partly embedded in pitch or waxy materials satisfactorily, but these materials are flammable, and there are capacitor applications in which use of such materials is ill-advised. The housings themselves have been provided with internal ribs but these are not adjustable, and thus there are limits to the amount of size difference that can be tolerated. Alternatively, the housings have been indented after the sections are in place, but this design has the drawback that the indenting may not be deep enough to hold the section or too deep and crush the section.

Separate mounting devices have also been used in the prior art. These devices have been in the form of pronged supports with lateral arms that snugly fit into the bottom of the can, spring clamp members, corrugated spacers, and tubular members with internal ribs or those that collapse into pleats. All can tolerate certain size variations but have fairly narrow tolerance limits.

SUMMARY OF THE INVENTION

It is a feature of this invention to provide a mounting spacer device that can compensate for greater size variations than heretofore possible thus making it possible to reduce spacer and/or can or housing inventories.

In accordance with this invention a rectangular sheet with a plurality of fingers extending from one side thereof is wrapped around a capacitor section with the fingers pointing outwardly. The fingers are resiliently urged against the interior of the housing, thereby holding the section in place.

The mounting spacer of the present invention is a sheet of resilient material, preferably metal, that has fingers extending outwardly from one side of the sheet and that is wrapped around at least a major portion of the capacitor section. When the section and spacer are inserted into the housing or can, the fingers are compressed but press against the interior of the housing, thus holding the section in place.

DESCRIPTION OF THE PREFERRED EMBODIMENTS

Figure 1:
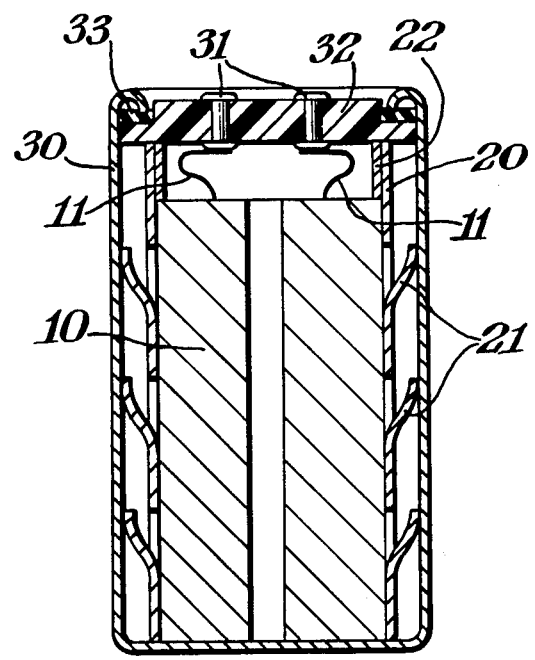
FIG. 1 is a cross-section of a capacitor using the mounting spacer device of the present invention.

A wound capacitor section 10 is wrapped in a mounting spacer 20 having fingers 21 extending outwardly from one side thereof. Fingers 21 are pressed against the interior of can 30 thereby holding section 10 in place laterally. Insulating ring 22 serves to insulate section 10 from cover 32 and also prevents vertical movement of section 10 within can 30. Electrode tabs 11 from section 10 are electrically connected to terminals 31 that extend through cover 32. Can 30 and cover 32 are conventionally sealed by rolling the edge of can 30 over insulating ring 33 surrounding the outer top edge of cover 32. Section 10 is impregnated with an electrolyte (not shown).

Figure 2:
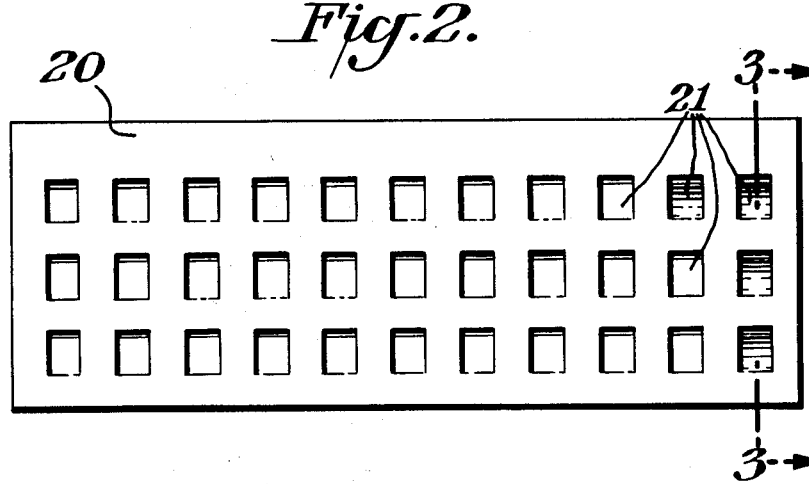
FIG. 2 is a plan view of the mounting spacer device of the present invention.

FIG. 2 shows mounting spacer 20 in an unrolled extended form. A plurality of fingers 21 are punched or cut out of spacer 20 at more than one vertical level, so that in use these fingers 21 provide support at more than one vertical level.

The sheet 20 is resilient enough so that when it is wrapped around section 10 and both sheet and section are inserted into a capacitor can or housing 30, fingers 21 are bent back toward the sheet 20, but still remain urged against the inside of can 30. The length of sheet 20 is such that it will encompass at least a major portion of the circumference of section 10.

Fingers 21 need not be evenly spaced in sheet 20 but may be staggered from row to row. Indeed, the rows of fingers 21 may be staggered so that fingers 21 do not extend one above the other as indicated in FIGS. 2 and 3.

Figure 3:
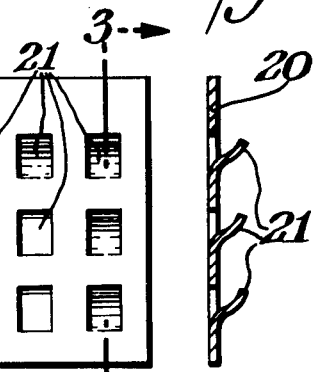
FIG. 3 is a cross-section taken along the line 3—3 of FIG. 2.

Fingers 21 are bent outwardly from spacer 20 as shown in FIG. 3, a cross-section taken along line 3—3 of FIG. 2. When spacer 20 is wrapped around capacitor section 10, the fingers 21 are compressed by the interior of can 30, as shown in FIG. 1, to hold the section 10 in place.

FIG. 2 shows that the mounting spacer 20 can be made as a continuous sheet and can be cut into appropriate lengths for use, thus cutting down on spacer inventory.

As an added advantage, mounting spacer 20 does not need to completely encompass section 10 but only needs to encompass a majority of it, preferably about 75-80% of it. Therefore, there may be a gap between adjacent edges of spacer 20 or such edges may meet when wrapped around the section. It is a feature of spacer 20 that it can compensate for variations in rolled section 10 diameter without the necessity of inventorying a large number of cans of different sizes. In this way, many mounting spacers 20 can be cut to a predetermined length and can be used for rolled sections whose diameters are within about 75-80% of each other. It is preferable, of course, that the sections be closer in size than this.

The fingers 21 can be cut in the metal sheet by any known manufacturing means and also pushed outwardly by known means. The relative number of fingers per length of strip is important only in that there are enough to rigidly support the capacitor in the can without weakening the strip.

The strip is preferably metal to act as a conductor of heat from the section to the can and is of a metal that is resilient enough to be wrapped around the section to hold the section firmly while the fingers hold the section and spacer in place. Spacer 20 must also be compatible with the other capacitor materials and is specifically of the same metal as the electrodes of the wound section. It preferably extends beyond the wound section, and it, plus insulating bushing 22, serve to hold the section in place against vertical movement of the section.

What is claimed:

1. An electrolytic capacitor including a container containing a round wound electrolytic capacitor section having metal electrodes, an antivibration mounting spacer substantially surrounding said section and comprising a sheet of metal with a plurality of fingers cut therein, said metal being the same as said electrodes of said wound electrolytic section, said fingers being pushed out on a same side of said sheet, said sheet being wrapped at least 75% around the circumference of said section with said fingers extending outwardly and upwardly with an opposite side of said sheet next to said section, said fingers being resiliently urged against the inside surface of said container to hold said section in place and prevent lateral movement in said container, and said spacer extending beyond said section to hold said section in place and prevent vertical movement in said container, said fingers being located at a plurality of different heights on said sheet to provide support vertically for said section, and an insulating ring located between said section and a cover for said capacitor, said ring also being next to said opposite side of said sheet.

* * * * *